Figure 1:
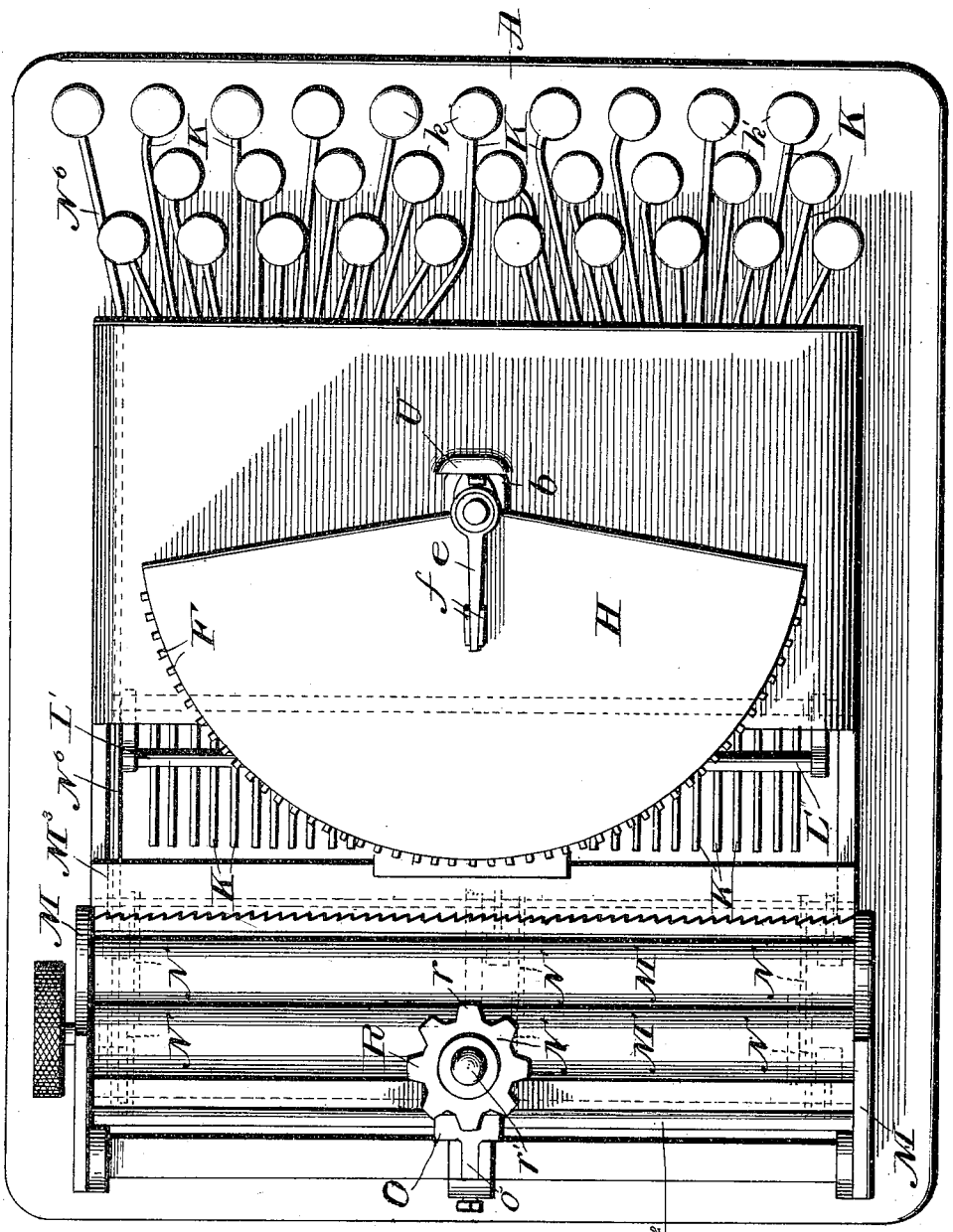

No. 654,217. Patented July 24, 1900.
F. H. ARMSTRONG.
TYPE WRITER.
(Application filed Feb. 5, 1900.)

(No Model.) 6 Sheets—Sheet 1.

Witnesses,
J. D. Kingsbury
B. W. Brockett

Inventor
Frank H. Armstrong
By Whitaker Prevost
Attorneys.

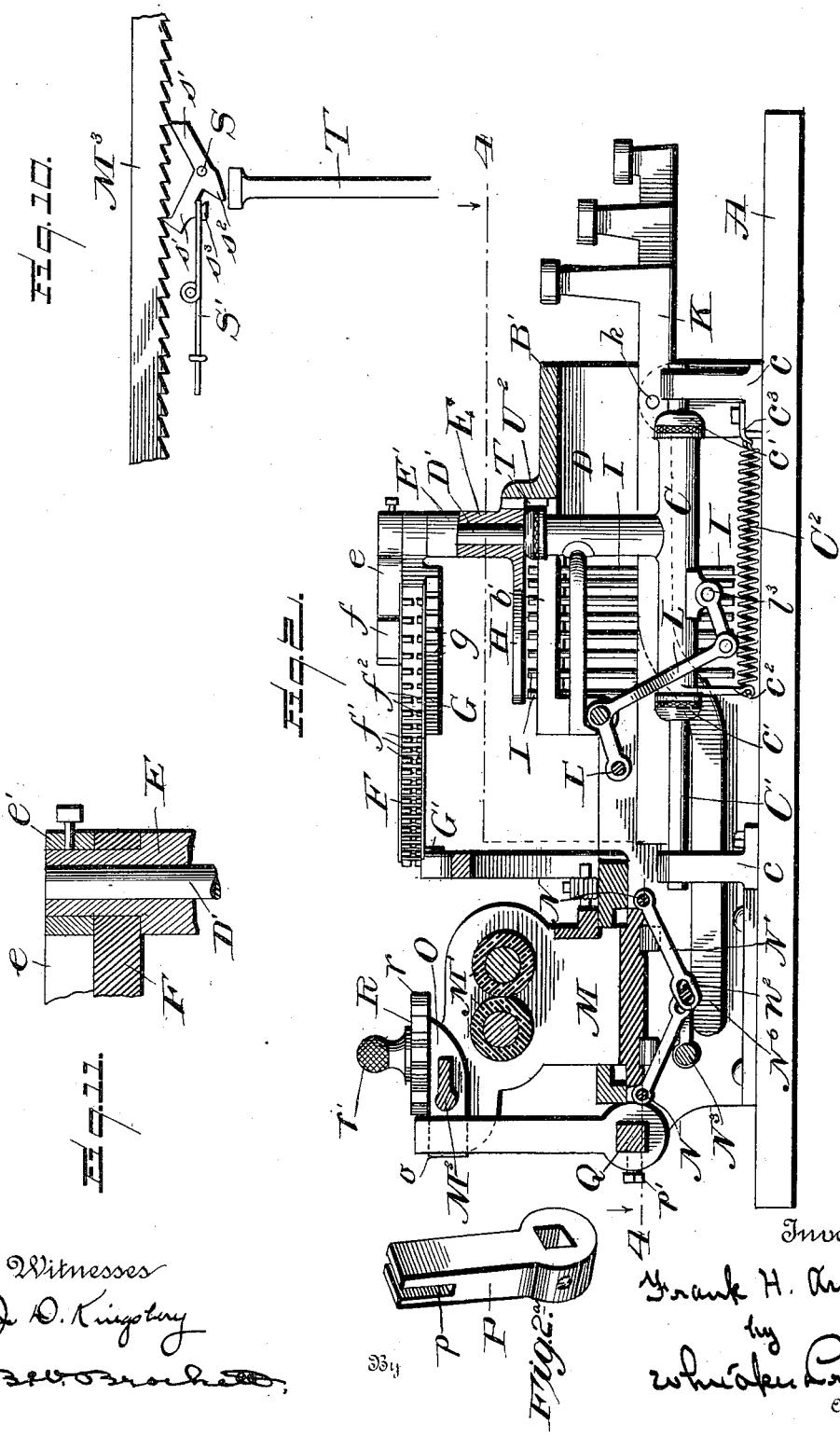

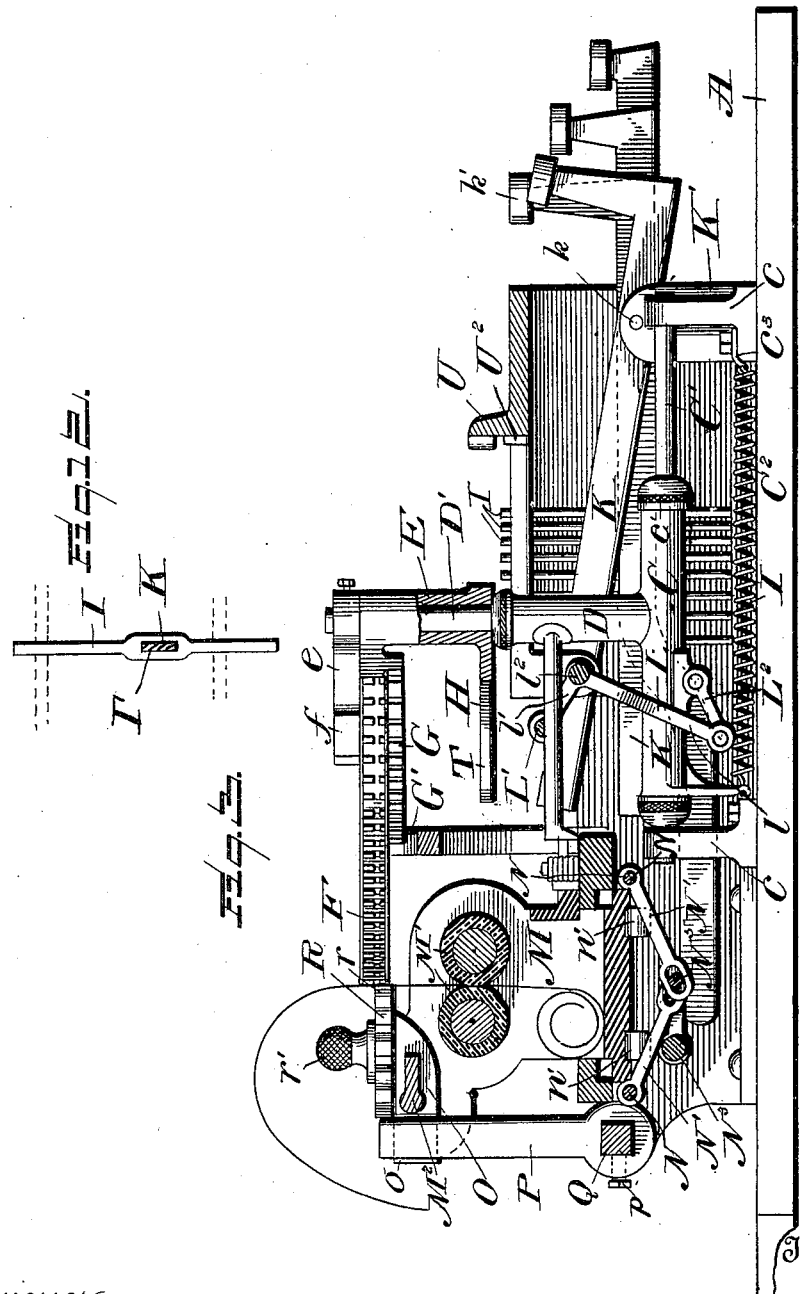

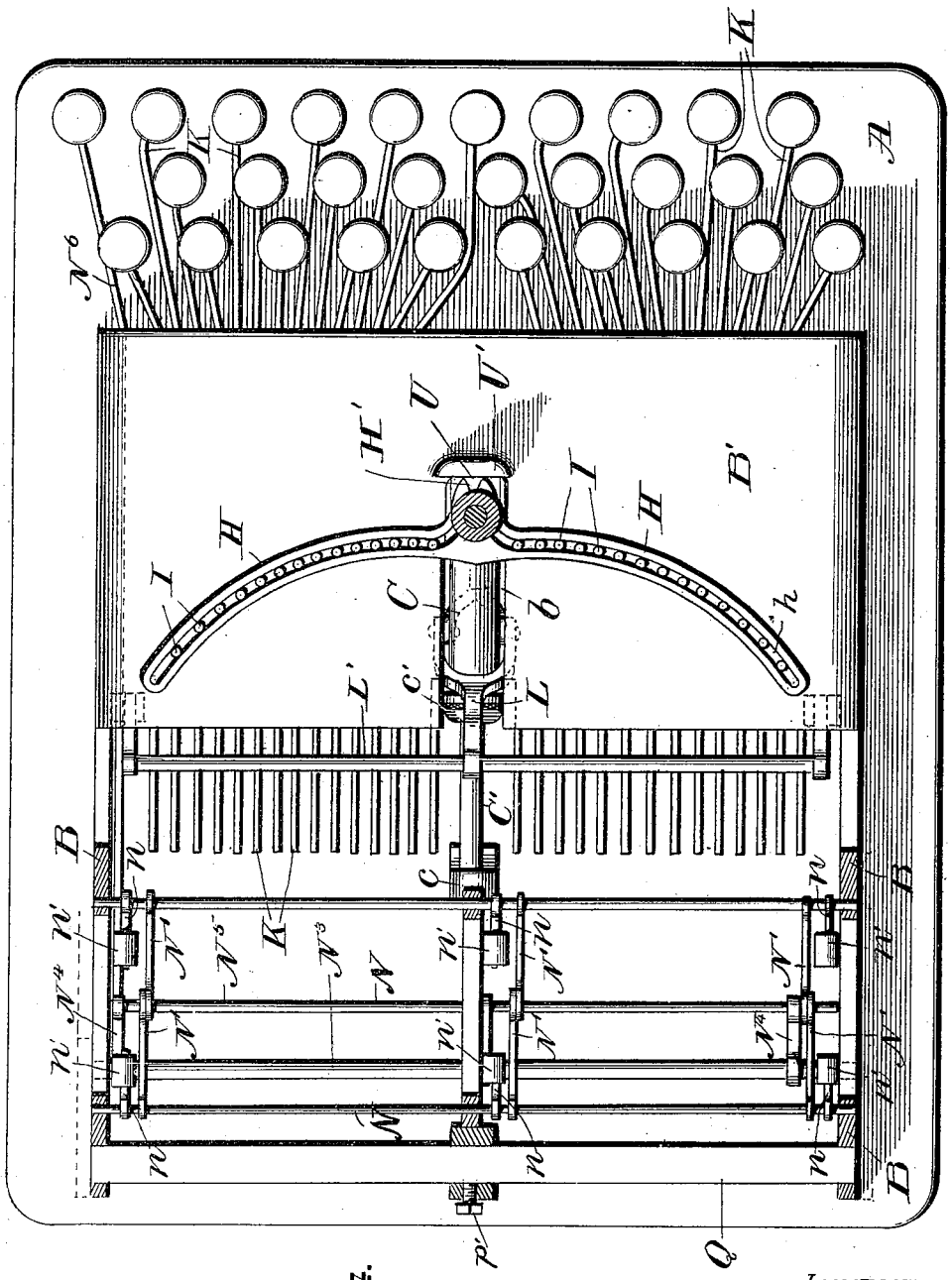

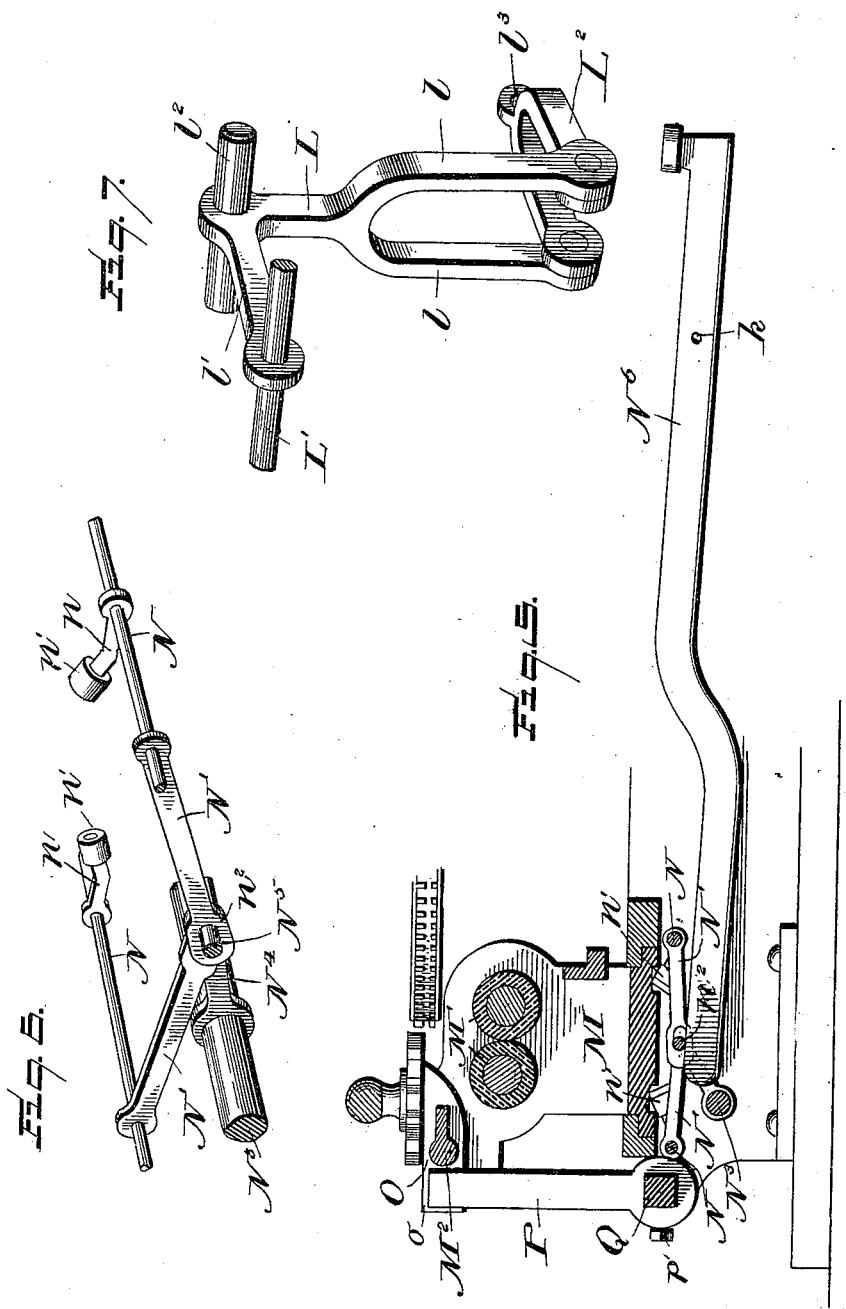

No. 654,217. Patented July 24, 1900.
F. H. ARMSTRONG.
TYPE WRITER.
(Application filed Feb. 5, 1900.)
(No Model.) 6 Sheets—Sheet 6.
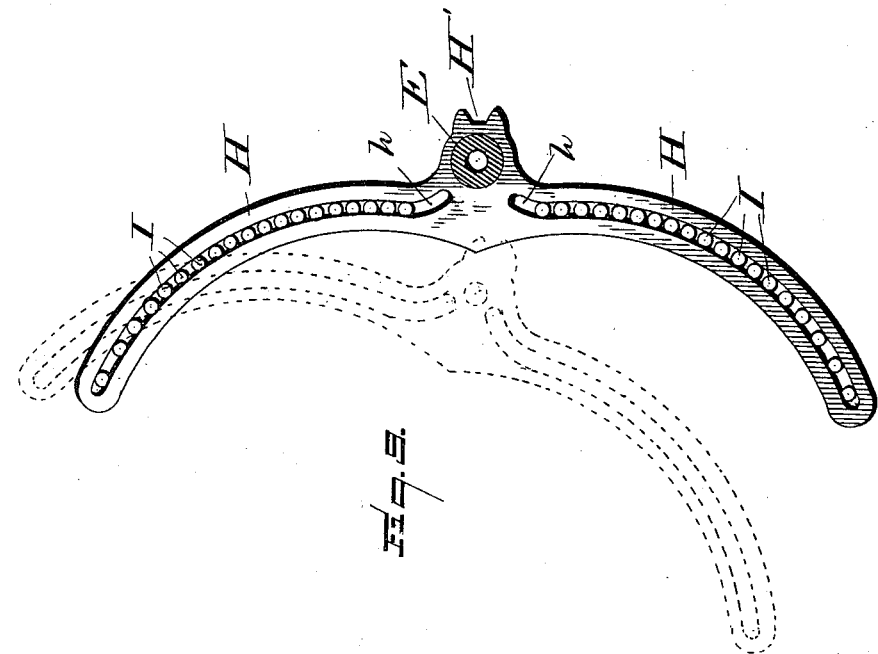
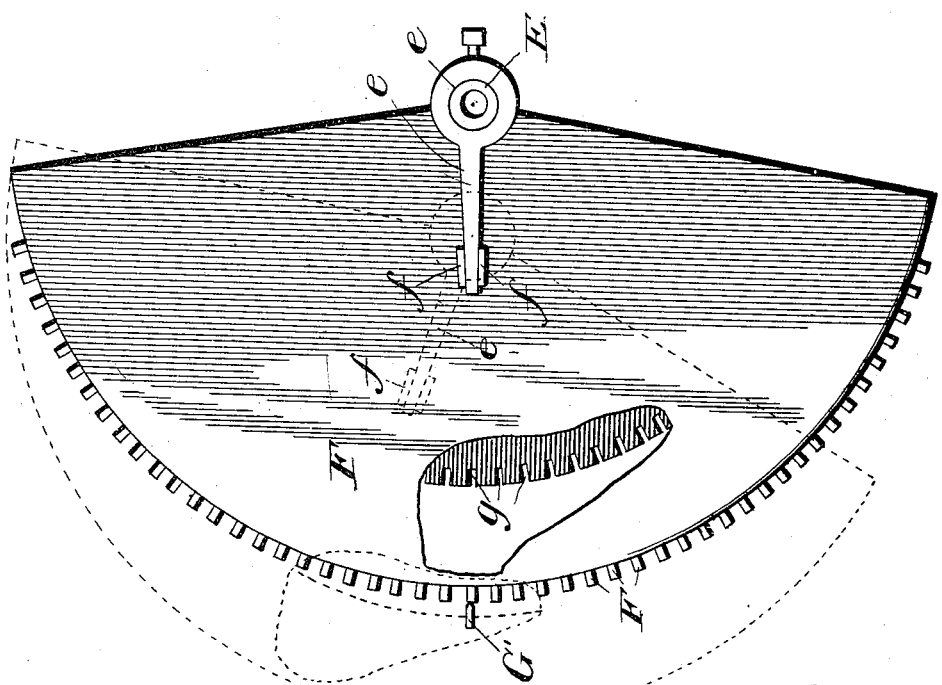
WITNESSES:
J. D. Kingsbury
B. W. Brockett
INVENTOR
Frank H. Armstrong.
BY
Attorneys.

UNITED STATES PATENT OFFICE.

FRANK H. ARMSTRONG, OF AUBURN, NEW YORK.

TYPE-WRITER.

SPECIFICATION forming part of Letters Patent No. 654,217, dated July 24, 1900.

Application filed February 5, 1900. Serial No. 4,043. (No model.)

*To all whom it may concern:*

Be it known that I, FRANK H. ARMSTRONG, a citizen of the United States, residing at Auburn, in the county of Cayuga and State of New York, have invented certain new and useful Improvements in Type-Writers; and I do hereby declare the following to be a full, clear, and exact description of the invention, such as will enable others skilled in the art to which it appertains to make and use the same.

My invention is an improvement in typewriting machines; and it consists in the novel features hereinafter described, reference being had to the accompanying drawings, which illustrate one form in which I have contemplated embodying my invention, and said invention is fully disclosed in the following description and claims.

Referring to the said drawings, Figure 1 represents a top plan view of my improved machine. Fig. 2 represents a vertical longitudinal section of the same, parts being shown in elevation. Fig. 2$^a$ is a detail view of a vertical standard adapted to be secured to the machine-frame. Fig. 3 is a view showing the type-segment and carriage moved rearwardly into printing position. Fig. 4 represents a horizontal sectional view of Fig. 2 on the line 4 4. Fig. 5 is a detail view, partly in section, showing one form of mechanism for raising the paper-carriage and printing-plate so as to cause the upper row of characters on the printing-segment to print. Fig. 6 is an enlarged detail view of a portion of the apparatus shown in Fig. 5. Fig. 7 is a detail perspective view of the bell-crank lever for causing the rearward movement of the carriage and type-segment. Fig. 8 is a top plan view of the printing-segment, a portion being broken away and another position of said segment being indicated in dotted lines. Fig. 9 is a plan view of the location-arms and location-pins, a different position of said arms being indicated in dotted lines. Fig. 10 is a detail of part of the paper-carriage feed. Fig. 11 is a detail sectional view showing the connection between the segment and its supporting-sleeve. Fig. 12 is a detail view illustrating the connection between one of the key-levers and its location-pin.

In the drawings, A represents the bed-plate or platen of the machine, and B represents the portions of the main frame secured to and extending above the platen A.

C represents the horizontally-movable carriage which carries the type-segment, which carriage consists in this instance of a sleeve adapted to slide on a guide-bar C', mounted rigidly in vertical supports c, secured to the platen A. The sleeve C may be provided at each end with ball-bearings, (indicated at c',) if desired, to reduce friction to a minimum, and said carriage is provided with a retracting-spring C², normally holding the carriage in its forward position and in this instance secured to an arm $c^2$, depending from the rear end of said carriage, and to a plate $c^3$, secured to the forward support c for the guide-rod.

D represents a vertical standard which extends upwardly from the carriage C and is rigidly secured thereto, the upper part of said standard engaging a guiding-slot b', formed in a horizonal plate B', extending across the machine and forming part of the main frame thereof, this construction maintaining the standard D in a vertical position during its backward and forward movements.

D' represents a shaft which extends upward from the standard D, and on this shaft is mounted a sleeve E, which carries at its upper end the type-segment F, the locking-segment G, and the location-arms H H, said parts being formed integrally with the sleeve E or formed separately and secured thereto, as may be found most desirable.

I prefer to make the segment F separate from the sleeve and to secure it thereto by means of a spring-arm e, secured to a plate e', which is connected to the said sleeve, the said spring-arm e being adapted to lie between lugs f f, formed on the upper face of the segment F. This construction enables the segment to be moved very slightly with respect to the sleeve E when necessary to avoid straining the parts.

The location-arms H H are rigidly secured to or formed integrally with the sleeve E and extend laterally on both sides of the same, being preferably curved, as shown in Fig. 9, and each arm H is provided with a curved slot h, as shown, extending substantially throughout its length, the said slots being adapted to receive the location-pins, hereinafter described.

I represents a series of vertically-movable location rods or pins, which are mounted in suitable guiding-apertures formed in the framework of the machine, the said pins being arranged in curved lines directly beneath the slots $h$ of the location-arms H, so that when the carriage is in its forward position the upward movement of any one of the pins I will project it through the slot $h$ of one of the location-arms H.

K K represent the key-levers, which are mounted in slots formed in the upper part of a block K', extending transversely across the front portion of the machine-frame. A transverse rod $k$ extends through the upper part of the block K' and forms the pivot for all of the levers K. Each of the key-levers K is provided at its forward end with a finger-piece $k'$, as usual. Each of the key-levers K is pivotally connected directly or indirectly with one of the vertically-movable location pins or rods I, so that the first portion of the downward movement of the finger-piece of each key-lever produces a corresponding upward movement of the rear portion of the lever, and thereby projects its pin I through the slot $h$ of one of the location-arms H. As indicated in Fig. 12, I prefer to connect the levers K and pins I by providing each pin I with a central slotted portion I', through which one of the levers K extends, thus forming substantially a pivotal connection which cannot get out of order. The projection of the pin I through the slot of the location-arm is the first effect produced by the movement of any of the key-levers K, and, conversely, the removal of the pin from the slot in the location-arm will be the last effect produced by the lever in returning to its normal position. It will be seen that if one of the pins is projected upward through the slot in one of the location-arms H and the carriage carrying the location-arm and the printing-segment is then moved rearward the said pin I will form a pivotal connection with the location-arm which it engages, and as the carriage moves rearward the sleeve E and the segment F will be caused to rotate upon the shaft D', so as to bring one or another of the type on the segment in line with the axis of rotation of the segment. The position of the location-pin which is thrown up into engagement with one of the location-arms will therefore determine the character on the segment which will be impressed.

I provide the following mechanism for causing the rearward movement of the carriage and type-segment by the depression of any one of the key-levers K.

L represents a bell-crank lever (shown in detail in Fig. 7) provided with downwardly-extending bifurcated arms $l$ and a substantially-horizontal arm $l'$, the said lever being mounted upon a pivot $l^2$, journaled in the main frame of the machine.

L' represents a bar which extends transversely of the machine a short distance above all of the key-levers K, (see Fig. 2,) so that when any one of the key-levers has been depressed far enough to throw its location-pin I into engagement with one of the location-arms H, the rear end of said lever will engage this cross-bar L'. The bifurcated arms $l$ of the bell-crank lever straddle the carriage C and are connected therewith at their lower ends by a yoke L², the forward end of which is pivoted to said carriage at $l^3$. It will thus be seen that when any one of the levers K engages the cross-bar L the further movement of said lever will move said cross-bar upward, and thereby move the carriage rearward, carrying with it the printing-segment and causing the partial rotation of said segment in one direction or the other and for a distance determined by the particular pin I which has been thrown into engagement with one of the location-arms. The carriage C is returned to its normal position by the spring C², which also serves to return the key-levers to their normal positions. I may, however, provide each key-lever with a retracting-spring, if found desirable.

In order to positively lock the segment when it has reached the extreme of its rearward movement and insure the impression being made at a particular printing-point, I provide the sleeve E or the segment F with the locking-plate G, before referred to, the rear face of which is in the form of a segment concentric with the rear face of the segment F and provided with a series of locking-notches $g$, each of which corresponds with one of the type on the printing-segment. G' represents a locking-stud which is preferably V-shaped in horizontal cross-section and is adapted to engage one of the notches $g\ g$ of the locking-plate whenever the segment is moved rearwardly, this construction insuring the proper horizontal alinement of the character selected by the key-lever and location pin and arm, as before described.

M represents the paper-carriage, which is capable of sliding transversely of the machine and is also capable of a slight vertical movement sufficient to shift the printing-line of the paper from the horizontal plane of one row of characters on the printing-segment to the next row above it. In the present instance I have shown the segment F provided with a lower row of type $f$ and an upper row of type $f'$, which I shall refer to hereinafter as the "lower-case" and "upper-case," respectively. Any suitable mechanism may be provided for elevating the carriage M. In the present instance I have shown two horizontal transverse shafts N N, mounted in the frame of the machine and provided with a series of arms $n$, carrying friction-rollers $n'$, engaging the under side of the carriage M. Each of said shafts N is provided with a rocking arm N', rigidly secured thereto and having a slotted portion $n^2$ at its free end.

N³ represents a transverse shaft provided with forwardly-extending arms N⁴, provided with studs N⁵, which engage the slotted portions of the locking-arms N'.

N⁶ represents an upper-case lever mounted similarly to the levers K and upon the pivotal rod $k$ thereof and having its rear end extending under one of the studs N⁵, previously described, for the purpose of raising it, and thereby raising the carriage M, as clearly shown in Fig. 5. The carriage M is provided with a pair of paper-feeding rollers M' M', and said carriage is also provided with a horizontal bar M², preferably of the keyhole shape indicated in cross-section in Figs. 2 and 5. On this bar is mounted a block O, provided with an aperture through which the bar M² can slide, the said block having a rearwardly-extending portion $o$, adapted to slide vertically in a slot $p$ in a vertical standard P, which is rigidly secured to the machine-frame, in this instance, by being secured to a square cross-bar Q by means of a set-screw $p'$. (See Figs. 2 and 5.) The standard P prevents the lateral movement of the block O, but permits it to move vertically with the carriage M and the cross-bar M², connected with said carriage. Upon the block O is mounted what I term the "impression-plate" R, which is a star-shaped plate provided with a series of narrow blunt points $r$, the ends of which form the surfaces which receive the shock of the impression when the printing-segment is moved rearwardly into printing position. I prefer to form these points or impression-faces of rubber; but they may be formed of other material, if desired. The impression-plate R is revolubly mounted on the block O, being placed on a stud, and it is adjusted so that one of its printing-points is in position to engage the printing character of the segment F. The plate R is clamped in the desired position upon the block O by means of a set-screw $r'$ on a threaded portion of the said stud. It will be observed that when one of the printing-faces of the printing-plate has become worn it is only necessary to turn the plate slightly to bring a fresh surface into printing position, and when all of the surfaces have become worn the impression-plate R can be renewed. The printing-surfaces of the impression-plate R are normally in a horizontal plane of the lower case of type on the segment F. When, however, the upper-case key is operated, the carriage will be elevated, as before described, thus carrying the paper and the impression-plate upward and bringing the latter into the horizontal plane of the upper case of type, as will be readily understood.

Any suitable mechanism may be provided for feeding the paper-carriage M transversely of the machine. In the present instance I have shown the carriage provided with a toothed-bar M³. (See Fig. 10.)

S represents an escapement-lever provided with two arms $s$ and $s'$ for engaging the notched bar M³ and an operating-ram $s²$.

S' represents a spring which engages a stud $s³$ on the lever S.

T represents a bar secured rigidly to the standard D and adapted to engage the operating-arm $s²$ of the escapement-lever S to effect the feed of the carriage one tooth whenever the carriage C and printing-segment are moved rearwardly into printing position.

From the foregoing description it will be seen that whenever the operator depresses one of the keys K its location-pin I will be thrown up into engagement with one of the location-arms H and the carriage C and segment F will be moved rearwardly, thereby turning the segment into position to bring the proper character in line with the printing-face of the impression-plate R, where it will be locked by the engagement of the locking-stud G' with the locking-plate G and an impression of the desired character will be made upon the paper, which is held in a vertical position by the feed-rollers M' M' in front of the impression-plate R. Upon the operator releasing the keys the spring C² causes the carriage C to move forward into its normal position, thereby drawing forward the lower end of arm L and depressing the cross-bar L', which pushes down the rear portion of the key-lever just previously operated and restores it quickly to nearly its normal position. The rear ends of all the levers are longer and heavier than the portions forward of their points of pivoting, and the levers drop readily into their normal positions after being returned by the cross-bar L' in the manner just indicated. In order to lock the printing-segment in its forward position, I provide a tapering projection U, (see Fig. 4,) secured to a stationary part of the frame and adapted to engage a notch H', which in this instance is formed in a part of the sleeve E immediately in front of the inner ends of the location-arms. The part U', to which the projection U is secured, may also be provided with an elastic buffer to take up the jar of the carriage in returning to its initial position under the action of its spring, if desired, and I have indicated such a buffer at U², immediately below the projection U.

The type on the type-segment may be inked in any desired manner, either by inking-rolls (not shown) or by providing an inking-ribbon mounted upon suitable feed-rollers and guides, (not shown,) as is usual in type-writing machines.

What I claim, and desire to secure by Letters Patent, is—

1. In a type-writer, the combination with a longitudinally-reciprocating carriage and a printing-segment pivotally mounted thereon, of a location-arm pivotally mounted on said carriage and operatively connected with said segment, a series of vertically-movable location-pins located adjacent to the travel of said location-arm but out of contact therewith, a series of key-levers operatively connected with said pins for moving them into position to engage the location-arm and operative connections between said levers and the carriage for moving it into printing position whereby the type-segment will be revolved during the movement of the carriage into printing position to bring the desired character in position to print, substantially as described.

2. In a type-writer, the combination with a longitudinally-reciprocating carriage, means for holding said carriage normally at one extreme of its reciprocation, a type-segment pivotally mounted on said carriage, and location-arms extending laterally in opposite sides of said carriage, pivotally mounted on said carriage and operatively connected with said segment, of a series of location-pins adjacent to but not in contact with said location-arms, a series of key-levers operatively connected with said pins to move them into position to engage said location-arms, operative connections between said levers and said carriage for moving it into printing position whereby said segment will be rotated during the movement of the carriage into printing position, to bring the desired character into position to print, substantially as described.

3. In a type-writer, the combination with the longitudinally-reciprocating carriage, a printing-segment pivotally mounted thereon, a location-arm pivotally mounted on said carriage, operatively connected with said segment and provided with a longitudinal slot, of a series of vertically-movable location-pins mounted in line with said slot in the location-arms, a series of key-levers operatively connected with said pins for moving them into engagement with said slot and operative connections between said levers and said carriage for moving the carriage into printing position, substantially as described.

4. In a type-writer, the combination with the longitudinally-movable carriage, a printing-segment pivotally mounted therein, and laterally-extending location-arms pivotally mounted on said carriage operatively connected with said segment, and provided with longitudinal slotted portions, of a series of vertically-movable location-pins mounted in line with the slotted portions of said location-arms but out of contact therewith, a series of key-levers each of which is connected operatively with one of said pins to move it into engagement with the slotted portion of its adjacent location-arm, mechanism for imparting longitudinal movement to said carriage to move it into printing position including a transverse bar in the path of and a short distance from each of said key-levers whereby when a key-lever is depressed its connected location-pin will be moved into engagement with one of said location-arms before the longitudinal movement of the carriage is effected, substantially as described.

5. In a type-writer, the combination with the longitudinally-movable carriage, a printing-segment pivotally mounted thereon, a locking-segment connected with said printing-segment and provided with a series of locking-notches corresponding with characters on said printing-segments, and location-arms pivotally mounted on said carriage, operatively connected with said printing-segment, a series of location-pins adapted to engage said location-arms, a series of key-levers connected with said pins for moving them into position to engage said location-arms, connections between said levers and the said carriage for moving the carriage and said printing-segment into printing position and a locking-projection adapted to engage one of the notches in said locking-segment, substantially as described.

6. In a type-writer, the combination with a longitudinally-reciprocating carriage and a printing-segment pivotally mounted thereon, of a location-arm pivotally mounted on said carriage and operatively connected with said segment, a series of vertically-movable location-pins located adjacent to the travel of said location-arms but out of contact therewith, a series of key-levers operatively connected with said pins for moving them into position to engage the location-arm and operative connections between said levers and the carriage for moving it into printing position whereby the type-segment will be revolved during the movement of the carriage into printing position, to bring the desired character in position to print, means for returning the said carriage from its printing position to normal position and devices for centering the segment upon its pivotal connection, substantially as described.

7. In a type-writer, the combination with a longitudinally-reciprocating carriage, means for holding said carriage normally at one extreme of its reciprocation, a type-segment pivotally mounted on said carriage, and location-arms extending laterally in opposite sides of said carriage, pivotally mounted on said carriage and operatively connected with said segment, of a series of location-pins adjacent to but not in contact with said location-arms, a series of key-levers operatively connected with said pins to move them into position to engage said location-arms, operative connections between said levers and said carriage for moving it into printing position whereby said segment will be rotated during the movement of the carriage into printing position, to bring the desired character into position to print, a part connected with said segment provided with a V-shaped notch, and a V-shaped stationary projection for engaging said V-shaped notch to center said segment upon its pivotal connection, substantially as described.

In testimony whereof I affix my signature in the presence of two witnesses.

FRANK H. ARMSTRONG.

Witnesses:
NETTIE I. FREESE,
W. H. HARRIS.